United States Patent Office 3,251,736
Patented May 17, 1966

3,251,736
METHODS OF EXTERMINATING LIVER-FLUKE WITH SALICYLANILIDES
Junichi Sugayama, Kitatama-gun, Tokyo, Kazuo Kagiwada, Shinjuku, Tokyo, Gosaku Saito, Nerima-ku, Tokyo, Tosio Takano, Taito-ku, Tokyo, Akira Ueno, Itabashi-ku, Tokyo, and Yoshio Momoki, Setagaya-ku, Tokyo, Japan, assignors to Kaken Kagaku Kabushiki Kaisha, Tokyo, Japan, a corporation of Japan
No Drawing. Filed June 5, 1963, Ser. No. 285,568
Claims priority, application Japan, June 12, 1962, 37/23,753
3 Claims. (Cl. 167—53)

The present invention relates to a parasiticidal composition for exterminating a liver-fluke of animals.

A liver-fluke is parasitic on the liver or biliary ducts of ruminants such as cattle, sheep, and goats. The parasitic percentage of a liver-fluke in Japan is said to be 20–50% depending on districts. The injury is observed particularly greatly in cattle. The amount of milk of suffering milking cows decreases to ¼ to ⅕ as much as that of normal cows. Furthermore, propagative trouble occurs in such cows. In the case of cattle for food, quality of beef is lowered and the quantity of beef decreases. In the case of cattle for labour, labour efficiency is lowered. In the case of sheep, quality of wool is lowered and its quantity decreases. Those undesirable effects are quite substantial.

For killing a liver-fluke ethane hexachloride, or 2,2'-thio-bis(4,6-dichlorophenol) has been used previously. As to ethane hexachloride, it is necessary to administer so much as 250–300 mg. per kg. of the weight of animals. Moreover, ill effect is observed for several hours to several days after administering ethane hexachloride. In the worst cases, animals die. The amount of 2,2'-thio-bis(4,6-dichlorophenol) to be administered may be less than that of ethane hexachloride, and the ill effect is smaller. However, the parasitic effect of 2,2'-thio-bis(4,6-dichlorophenol) is still not sufficient.

The parasiticidal composition for exterminating a liver-fluke of animals according to the present invention is characterized in that salicylanilide derivatives represented by the formula

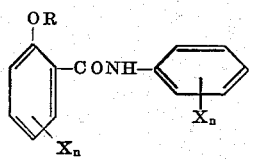

wherein the R is hydrogen, the X is halogen or nitro group, and the $n$ is an integar of 0, 1 or 2, are contained as effective ingredients.

These compounds are known as bactericides and fungicides for external application, but are not known as effective parasiticides for a liver-fluke of animals at all. We have found recently as the result of research on many compounds that these compounds have quite excellent parasitic effect for a liver-fluke, and have succeeded in inventing the present invention.

These compounds may be mixed with excipients such as starch, lactose, and calcium carbonate to form powder or a tablet, or they, as they are, are mixed with feed and given to animals. Depending upon the kind of an animal, such a small amount as 10–20 mg. per kg. of the weight of the said compound can attain excellent parasitic effect.

The parasiticidal composition of the present invention is tasteless, odorless, and non-stimulative, so that administration is easy. Moreover, there is neither fear of changing in quality when stored, nor ill effect. Furthermore, a liver-fluke can be killed completely by giving the parasiticide at one time. Accordingly, the parasiticidal composition of the present invention has particularly excellent utility.

*Example*

100 g. of 3,5-dichlorosalicyl-4'-chloroanilide represented by the formula

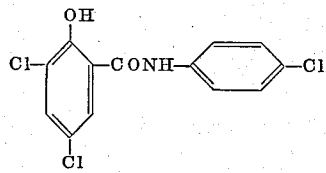

and 100 g. of lactose were uniformly mixed to form a powdery parasiticide.

The parasiticide was administered to cattle, sheep and goats, respectively, in an amount of 20–40 mg. per kg. of the weight. Liver-flukes were completely killed by once oral administration. By examining eggs of liver-flukes, the conversion-to-negative of animals to which had been given the present parasiticide was 100% 5–10 days later. When said animals were dissected in order to confirm the presence of liver-flukes, the liver-flukes had been completely digested and absorbed, and no fluke was found. Ill effect was scarcely observed. Change of the temperature and the condition of excrements of animals to which had been given the present parasiticidal composition were normal. The said animals had normal appetite.

Also in the cases of employing 5-chlorosalicyl-4'-chloroanilide represented by the general formula of

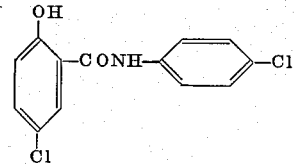

5-bromosalicyl-4'-bromo-anilide represented by the general formula of

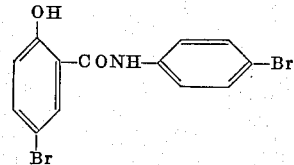

salicyl-4'-nitro-anilide represented by the general formula of

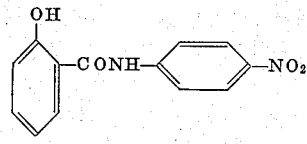

and 3,5-dichlorosalicyl-3',4'-dichloroanilide represented by the general formula of

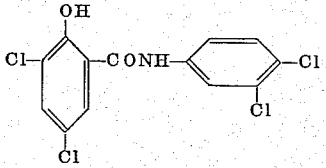

respectively such a small amount as 10–50 mg. per kg. of the weight of an animal could attain efficiency, but the degree of the effect was different in accordance with each compound.

What we claim is:

1. A process for exterminating a liver-fluke of warm-blooded animals comprising orally administering to the effected host an effective quantity of the compound represented by the following formula:

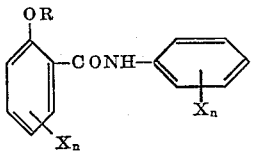

wherein R is hydrogen, X is halogen and $n$ is an integer of 0-2.

2. A method according to claim 1, wherein said compound is administered in a quantity of 10-50 mg. per kg. of the weight of the animal.

3. A process for exterminating a liver-fluke of warm-blooded animals comprising orally administering the compound 3,5-dichlorosalicyl-4'-chloroanilide in a quantity of 20-40 mg. per kg. of the weight of the animal.

References Cited by the Examiner

UNITED STATES PATENTS 2,731,386 1/1956 Reiner _____ 167—58
3,074,848 1/1963 Gonnert.

OTHER REFERENCES

Gonnert: Chem. Abst., vol. 55, 1961, page 10707f.

JULIAN S. LEVITT, *Primary Examiner.*

FRANK CACCIAPAGLIA, *Examiner.*

SAM ROSEN, *Assistant Examiner.*